United States Patent
Guo (10) Patent No.: US 10,075,430 B2
(45) Date of Patent: Sep. 11, 2018

(54) METHOD AND SYSTEM FOR EFFICIENT PASSWORD INPUT

(71) Applicant: Alibaba Group Holding Limited, George Town, Grand Cayman (KY)

(72) Inventor: Wei Guo, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 211 days.

(21) Appl. No.: 14/837,937

(22) Filed: Aug. 27, 2015

(65) Prior Publication Data
US 2016/0065562 A1    Mar. 3, 2016

(30) Foreign Application Priority Data

Aug. 27, 2014    (CN) .......................... 2014 1 0429739

(51) Int. Cl.
| | | |
|---|---|---|
| *H04L 29/06* | (2006.01) | |
| *G06F 3/023* | (2006.01) | |
| *G06F 21/31* | (2013.01) | |
| *H04W 12/06* | (2009.01) | |
| *G06F 3/0488* | (2013.01) | |

(52) U.S. Cl.
CPC .......... *H04L 63/083* (2013.01); *G06F 3/0236* (2013.01); *G06F 3/04886* (2013.01); *G06F 21/31* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 7,941,760 B2 * | 5/2011 | Kocienda | G06F 3/04886 715/773 |
| 8,176,324 B1 | 5/2012 | Krishnamurthy | |
| 9,111,073 B1 * | 8/2015 | Jiang | G06F 21/36 |
| 9,621,348 B2 * | 4/2017 | Bahjat | H04L 9/3226 |
| 2005/0071637 A1 | 3/2005 | Shirakawa | |

(Continued)

FOREIGN PATENT DOCUMENTS

| | | | | |
|---|---|---|---|---|
| EP | 2990925 A1 * | 3/2016 | ......... | G06F 3/04886 |
| WO | WO 2013149883 A1 * | 10/2013 | ......... | G06F 3/04886 |
| WO | WO 2017080768 A1 * | 5/2017 | ......... | G06F 3/04886 |

*Primary Examiner* — Morshed Mehedi
*Assistant Examiner* — Richard A McCoy
(74) *Attorney, Agent, or Firm* — Shun Yao; Park, Vaughan, Fleming & Dowler LLP (57) ABSTRACT

Embodiments of the present application disclose a method for receiving password input from a user. During operation, the system receives, by a computing device, user input indicating that a user is entering a password. The system displays a plurality of shortcut keyboards of a keyboard sequence in successive order based on an arrangement of characters in the password. The system displays a first shortcut keyboard with a first key labeled with at least a first character of the password prior to displaying a second shortcut keyboard with a second key labeled with one or more characters positioned subsequent to the first character in the password. The system then receives input from the user selecting at least one key of each shortcut keyboard from the plurality of shortcut keyboards, and determines the password entered by the user based on the characters entered by the user through the key selections.

21 Claims, 8 Drawing Sheets

(56) References Cited

U.S. PATENT DOCUMENTS

| | | | |
|---|---|---|---|
| 2006/0056626 A1* | 3/2006 | Keohane | G06F 3/04895 380/206 |
| 2009/0106825 A1* | 4/2009 | Cerruti | G06F 21/31 726/5 |
| 2009/0195506 A1* | 8/2009 | Geidl | G06F 3/0237 345/168 |
| 2010/0060585 A1* | 3/2010 | Chiu | G06F 3/04886 345/168 |
| 2010/0073302 A1* | 3/2010 | Ritzau | G06F 3/0233 345/173 |
| 2011/0016520 A1 | 1/2011 | Cohen et al. | |
| 2012/0204256 A1* | 8/2012 | Craine | G06F 21/31 726/18 |
| 2012/0299831 A1 | 11/2012 | Lioy | |
| 2014/0306896 A1* | 10/2014 | Sosby | H04M 1/274558 345/168 |
| 2015/0356288 A1* | 12/2015 | Guo | G06F 21/36 726/18 |
| 2016/0077734 A1* | 3/2016 | Buxton | G06F 3/04842 715/773 |

* cited by examiner

METHOD AND SYSTEM FOR EFFICIENT PASSWORD INPUT

RELATED APPLICATION

Under 35 U.S.C. 119, this application claims the benefit and right of priority of Chinese Patent Application No. 201410429739.4, filed 27 Aug. 2014.

BACKGROUND

Field

The present invention relates to computer security, and particularly relates to a method and system for efficient password input.

Related Art

During a typical day, a user may need to enter a password multiple times on a mobile computing device or other computer for a variety of different application scenarios. For example, when a user logs into an email service (e.g., a www.163.com mailbox), the user needs to input an email service password. When the user wants to manage his bank account, the user may log onto his bank account online by entering an account password. The continued development of mobile network technology enables a user to access his accounts over the Internet using not only traditional computers, but also using a mobile device such as a mobile phone, tablet device, or other mobile computing device.

Regardless of the specific application scenario, the user will usually set a complex password for security reasons. For example, the user may set the password to "1ca86&" or some other complex password that includes multiple types of characters. These characters may be numbers, letters of the alphabet, symbols, or other characters. When inputting the password, the user may need to constantly switch between multiple on-screen keyboards, such as a numeric keypad, an alphabetic keyboard and a symbol keyboard, which is very cumbersome and inefficient.

SUMMARY

One embodiment of the present invention provides a system for receiving password input from a user. During operation, the system receives, by a computing device, user input indicating that a user is entering a password. The system displays a plurality of shortcut keyboards of a keyboard sequence in successive order based on an arrangement of characters in the password. The system displays a first shortcut keyboard with a first key labeled with at least a first character of the password prior to displaying a second shortcut keyboard with a second key labeled with one or more characters positioned subsequent to the first character in the password. The system then receives input from the user selecting at least one key of each shortcut keyboard from the plurality of shortcut keyboards, and determines the password entered by the user based on the characters entered by the user through the key selections.

In a variation of this embodiment, the system generates the keyboard sequence corresponding to the password based on the password input from the user, in which the keyboard sequence includes at least two shortcut keyboards.

In a further variation, generating the keyboard sequence corresponding to the password includes generating the keyboard sequence in a memory of the computing device.

In a further variation, generating the keyboard sequence includes generating the keyboard sequence with at least one shortcut keyboard with zero characters from the password.

In a further variation, the system receives user input setting a security level for generating the keyboard sequence. Generating the keyboard sequence includes, based on the security level, setting parameters for the keyboard sequence that include a number of shortcut keyboards, a number of shortcut keyboards with zero password characters, and/or a number of random characters that are not password characters on each shortcut keyboard.

In a further variation, generating the keyboard sequence corresponding to the password includes generating the keyboard sequence to include at least one shortcut keyboard with a key used for inputting at least two password characters simultaneously.

In a variation of this embodiment, displaying the plurality of shortcut keyboards of the keyboard sequence includes detecting a password input scenario associated with the user inputting the password. The system then retrieves data indicating a corresponding relationship between the password input scenario and a keyboard sequence, and displays the keyboard sequence corresponding to the password input scenario.

In a further variation, detecting the password input scenario includes determining that the user is inputting the password as part of a login scenario or a payment scenario or that the password is for a specific application, and further includes storing data corresponding the keyboard sequence with one of the login scenario, the payment scenario, or the specific application.

In a further variation, the system receives keyboard configuration information to configure the plurality of shortcut keyboards in the keyboard sequence, and configures the plurality of shortcut keyboards according to the keyboard configuration information.

In a variation of this embodiment, the system receives user input to enable or disable generating a keyboard sequence, or to delete or select a keyboard sequence. Based on the user input, the system performs one of enabling generating a keyboard sequence, disabling generating a keyboard sequence, deleting a keyboard sequence, and selecting a keyboard sequence.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

Embodiments of the present invention solve the problem of cumbersome and inefficient password input by displaying in succession a sequence of shortcut keyboards that may each include a key with one or more password characters. As each of the shortcut keyboards is displayed, a user can click on a key labeled with one or more password characters to input the characters. The user can avoid switching back and forth between different keyboards, such as switching between a numeric keypad, an alphabetic keyboard, and a symbol keyboard. For a complex password that includes special characters, numbers, and alphabetic characters (e.g., such as "1ca86&"), switching between multiple keyboards can be especially inconvenient. By anticipating the next key that the user might need and displaying this key with other random keys, a password input system can facilitate efficient password input and authenticate the user quickly and conveniently.

Figure 1:
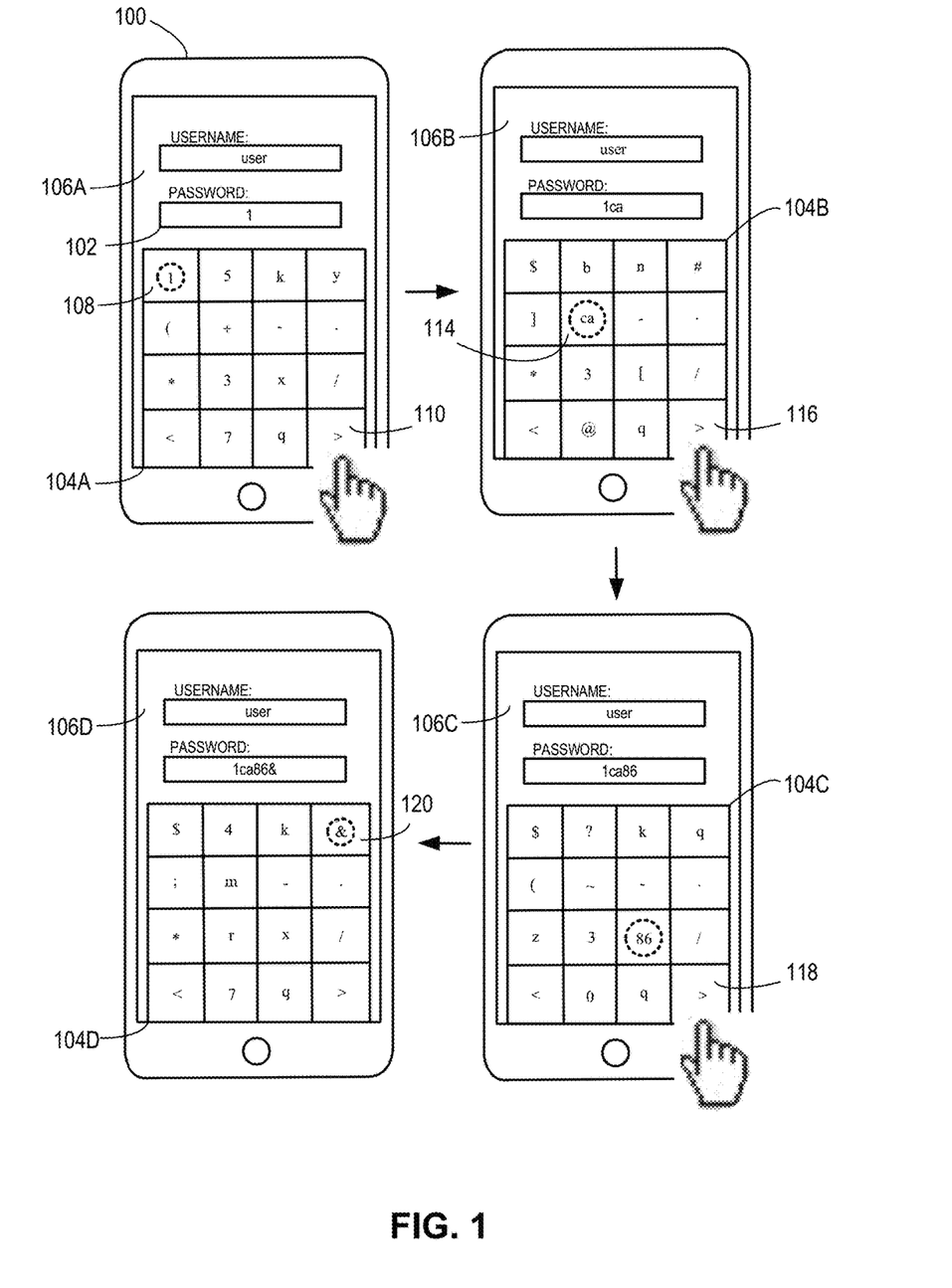
FIG. 1 presents an illustration of a mobile device displaying in successive order shortcut keyboards from a keyboard sequence to facilitate efficient user input of a password, in accordance with an embodiment of the present invention.

FIG. 1 presents an illustration of a mobile device 100 displaying in successive order shortcut keyboards from a keyboard sequence to facilitate efficient user input of a password, in accordance with an embodiment of the present invention. As illustrated in FIG. 1, a user may efficiently input a password through a series of input operations performed on shortcut keyboards displayed on mobile device 100. A shortcut keyboard may have a key labeled with one or more characters from the password. After the system displays a first shortcut keyboard with one or more characters from the password, the system then displays the next shortcut keyboard with one or more characters from the password that are positioned subsequent to the characters of the first shortcut keyboard.

During operation, the user may click on a password input field 102 displayed on mobile device 100 to begin entry of the password. Mobile device 100 may display a shortcut keyboard 104A. Shortcut keyboard 104A displayed on a screen 106A only includes the input character "1" from the password "1ca86&" (e.g., the "1" is highlighted by a dotted circle on screen 106A) on one of the keys. The other keys of the keyboard may be labeled with random characters, and the user may click on a key 108 labeled "1" to input the number "1" into password field 102. Then, the user clicks a key 110 labeled with a symbol ">" located at the lower right corner of the keyboard to switch the displayed keyboard to the next shortcut keyboard.

Mobile device 100 changes the displayed keyboard to a shortcut keyboard 104B displayed on screen 106B. Shortcut keyboard 104B displayed on screen 106B only includes "ca" in the password "1ca86&", and the user may click on a key 114 labeled with "ca" to input the letters "ca" as part of the password. Then, the user clicks a key 116 labeled with ">" at the lower right corner of the keyboard to display a shortcut keyboard 104C on screen 106C. The user may input "86" as the next two characters of the password by clicking on a key 118.

Finally, the user switches to a shortcut keyboard 104D displayed on screen 106D to input "&" as the final character of the password. The user may input "&" by clicking on a key 120. After entering the last character, the user has completed input of the entire password.

As illustrated in FIG. 1, the user may input the password through a series of shortcut keyboards, and the user may quickly switch to the next keyboard simply by clicking a key with the ">" label. The system displays the shortcut keyboards based on the sequence of the password characters, and the user only needs to click a key to switch the next shortcut keyboard in the keyboard sequence. The password input operation is convenient and fast, without the need to switch back and forth among various keyboards, thereby improving password input efficiency.

Efficiently Entering a Password

Figure 2:
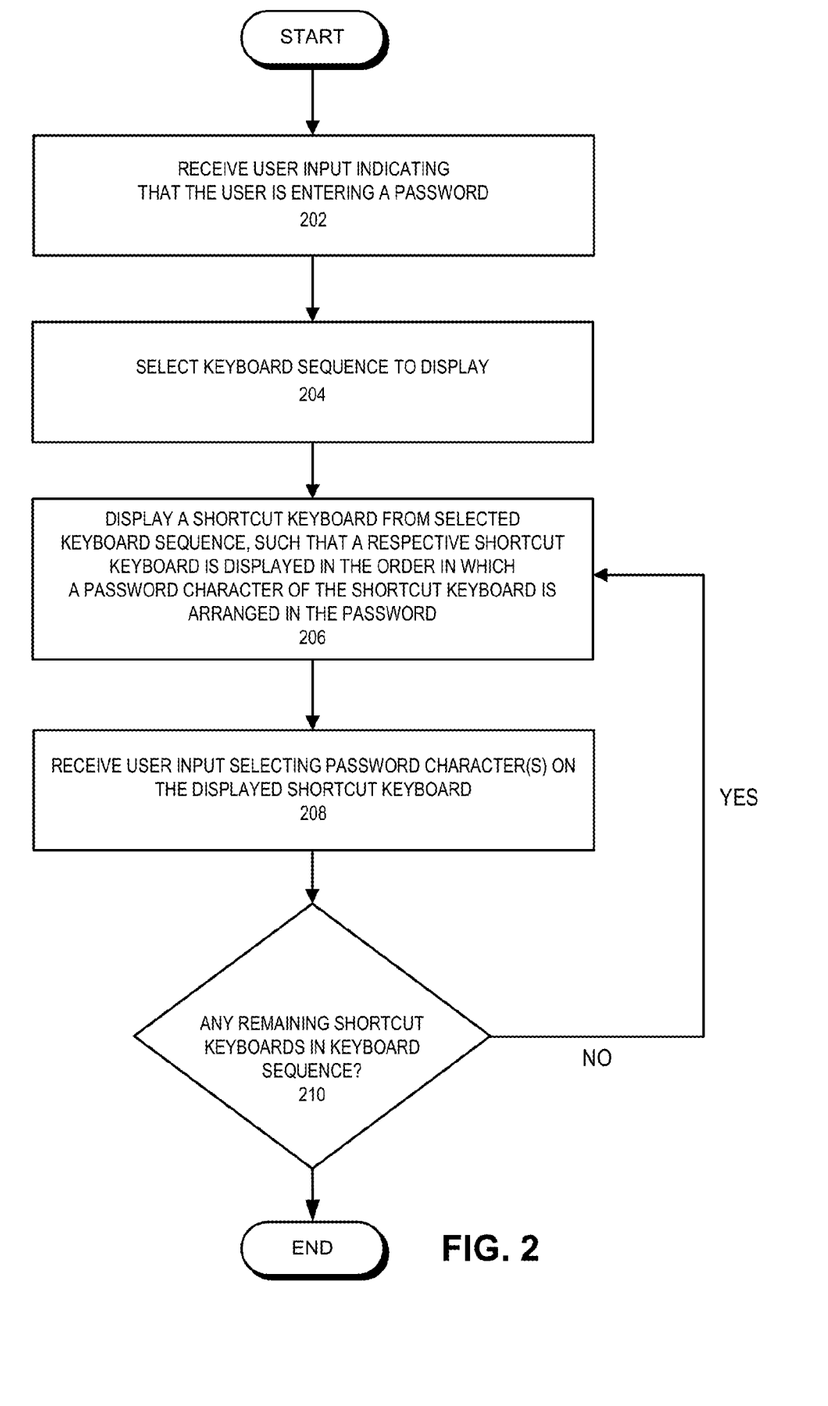
FIG. 2 presents a process for efficiently entering a password, in accordance with an embodiment of the present application.

FIG. 2 presents a process for efficiently entering a password, in accordance with an embodiment of the present application. During operation, the system may initially receive user input indicating that the user is entering a password (operation 202). For example, the user may click on a password input field (e.g., password input field 102 of FIG. 1) on a mobile phone to begin entry of the password. The system may also detect that the user is prompted to input a password and automatically display the shortcut keyboard.

Next, the system selects a keyboard sequence to display (operation 204). The system may determine the keyboard sequence to display based on various factors. For example, the system may determine the scenario or application for which the user is entering the password. The user may also select the keyboard sequence, or the system may display a default keyboard sequence. Determining which keyboard sequence to display is discussed in greater detail below.

The system then displays a shortcut keyboard from the selected keyboard sequence (operation 206). The system may display a sequence of shortcut keyboards generated from the characters of the password. The system displays the shortcut keyboards one at a time and in successive order. The system may display the shortcut keyboards in a sequence corresponding to the order in which the password character or characters presented in the respective shortcut keyboards are arranged in the password. This corresponds to the order in which the user would normally type in the password characters. For example, the system may display a sequence of characters appearing on their respective shortcut keyboards in the following order: "1"→"ca"→"86"→"&". This displayed order corresponds to the order of the characters as the characters are positioned in the password "1ca86&". The keyboard sequence is specific to the password. If the password is different, such as a password with characters "&186ca", then the keyboard sequence is also different. Furthermore, to confuse malicious parties attempting to gain unauthorized access, the keyboard sequence may also include one or more shortcut keyboards with zero characters from the password. Such a shortcut keyboard may display only characters that are not found in the password. Shortcut keyboards with zero password characters are discussed in detail with respect to FIG. 4.

The system may then receive user input selecting one or more password characters from the displayed shortcut keyboard (operation 208). The user may select the one or more password characters by clicking on a key labeled with the one or more password characters. Each time the system displays a shortcut keyboard, the system waits for the user to select a key from the shortcut keyboard.

The system then determines whether there are any remaining shortcut keyboards in the keyboard sequence (operation 210). If there are remaining shortcut keyboards in the keyboard sequence, the system continues to display the next shortcut keyboard (operation 206). If there are no remaining shortcut keyboards in the keyboard sequence, the user is finished with inputting the password.

The system may assemble together the characters entered by the user to create the password. The system may also make available the characters of the password to another code section, function, or application. For example, the system may copy the password to another memory location or return the password as a result of a function call. In some implementations, the system may determine whether the user has entered the correct password.

Generating a Keyboard Sequence

Figure 3:
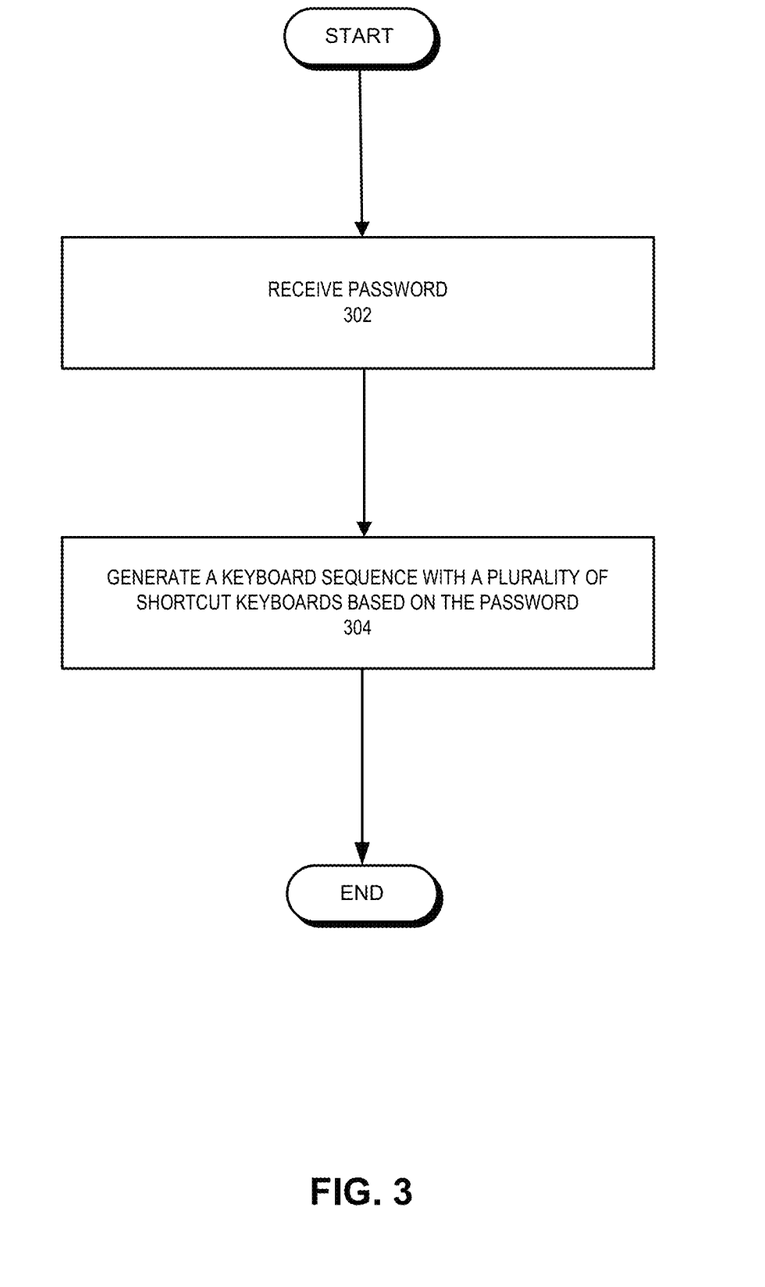
FIG. 3 presents a process for generating a keyboard sequence based on a password, in accordance with an embodiment of the present application.

FIG. 3 presents a process for generating a keyboard sequence based on a password, in accordance with an embodiment of the present application. During operation, the system receives a password (operation 302). The system may receive the password through user input. The system then generates a keyboard sequence with a plurality of shortcut keyboards, based on the password (operation 304).

As illustrated in FIG. 3, the system may generate and store a sequence of shortcut keyboards based on password data submitted by the user. For example, a user may input a password (e.g., "&186ca" password), and in response to receiving the password, the system generates the keyboard sequence based on the password. The system may generate a keyboard sequence the first time the user inputs the password or during subsequent input of the password, depending on implementation. The system may store the keyboard sequence, and display the keyboard sequence the next time the user attempts to input a password. Some examples of the different ways that the system may generate a keyboard sequence are discussed in detail below.

When the user inputs a password for an email service on his mobile phone the first time, the system may receive the password information. For example, the processor of the mobile phone may detect and analyze the input of the user and transmit the password information to the password input components on the mobile phone. The system may generate a keyboard sequence based on the password information. For example, if the user inputs "1ca86&" as characters of the password, the system may generate a corresponding keyboard sequence based on the password information.

The system may generate the keyboard sequence in multiple different ways by varying the number of characters on a key of a respective shortcut keyboard and varying the number of shortcut keyboards in a keyboard sequence. For example, some of the shortcut keyboards may have one password character per key, multiple password characters per key, or zero password characters per key.

The shortcut keyboards may include one character from the password for each shortcut keyboard in a keyboard sequence. In one example, the generated keyboard sequence may include 6 shortcut keyboards j1, j2, j3, j4, j5 and j6. Each shortcut keyboard includes only one password character. The shortcut keyboard j1 includes a key for inputting the "1" character and the other keys are random characters (e.g., characters that are not part of the password). The shortcut keyboard j2 includes a key for inputting the "c" character. The shortcut keyboard j3 includes a key for inputting the "a" character. The shortcut keyboard j4 includes a key for inputting the "8" character. The shortcut keyboard j5 includes a key for inputting the "6" character, and the shortcut keyboard j6 includes a key for inputting the "&" character. The system determines the proper ordering of the shortcut keyboards in the keyboard sequence so that the shortcut keyboards appear in the correct sequence j1, j2, j3, j4, j5 and j6 when displayed. This ensures that the user can efficiently input the password characters sequentially in the proper order.

The keyboards may include multiple characters from the password for each keyboard in a keyboard sequence. For example, the generated keyboard sequence may include three shortcut keyboards j1, j2 and j3. Shortcut keyboard j1 includes a key for simultaneously inputting the "1ca" characters, and the other keys on shortcut keyboard j1 are for inputting random characters. The user may input three characters with the click of the "1ca" key. The shortcut keyboard j2 includes a key for inputting the "8" character. The shortcut keyboard j3 includes a key for inputting the characters "6&" simultaneously. By allowing the user to simultaneously input multiple characters such as "1ca" via a single click, the user can input the password with greater speed and convenience. In contrast, standard password input approaches only allow the user to input one character with each click of a key.

For security reasons, the shortcut keyboards may include zero characters from the password for one or more shortcut keyboards in the keyboard sequence. For example, the generated keyboard sequence may include 8 shortcut keyboards, which are respectively keyboards j1, j2, j3 . . . j8. The shortcut keyboard j1 may include a key for inputting the "1" character, and the shortcut keyboard j2 may include a key for inputting the "c" character. The shortcut keyboard j3 has no password characters, and all keys of shortcut keyboard j3 are used for inputting random characters only. The shortcut keyboard j4 includes a key for inputting the "a" character. The shortcut keyboard j5 includes a key for inputting the characters "86" simultaneously. The shortcut keyboard j6 includes zero characters from the password. The shortcut keyboard j7 includes a key for inputting the "&" character, and the shortcut keyboard j8 also includes zero characters from the password.

Shortcut Keyboards with Zero Password Characters and Other Security Measures

Figure 4:
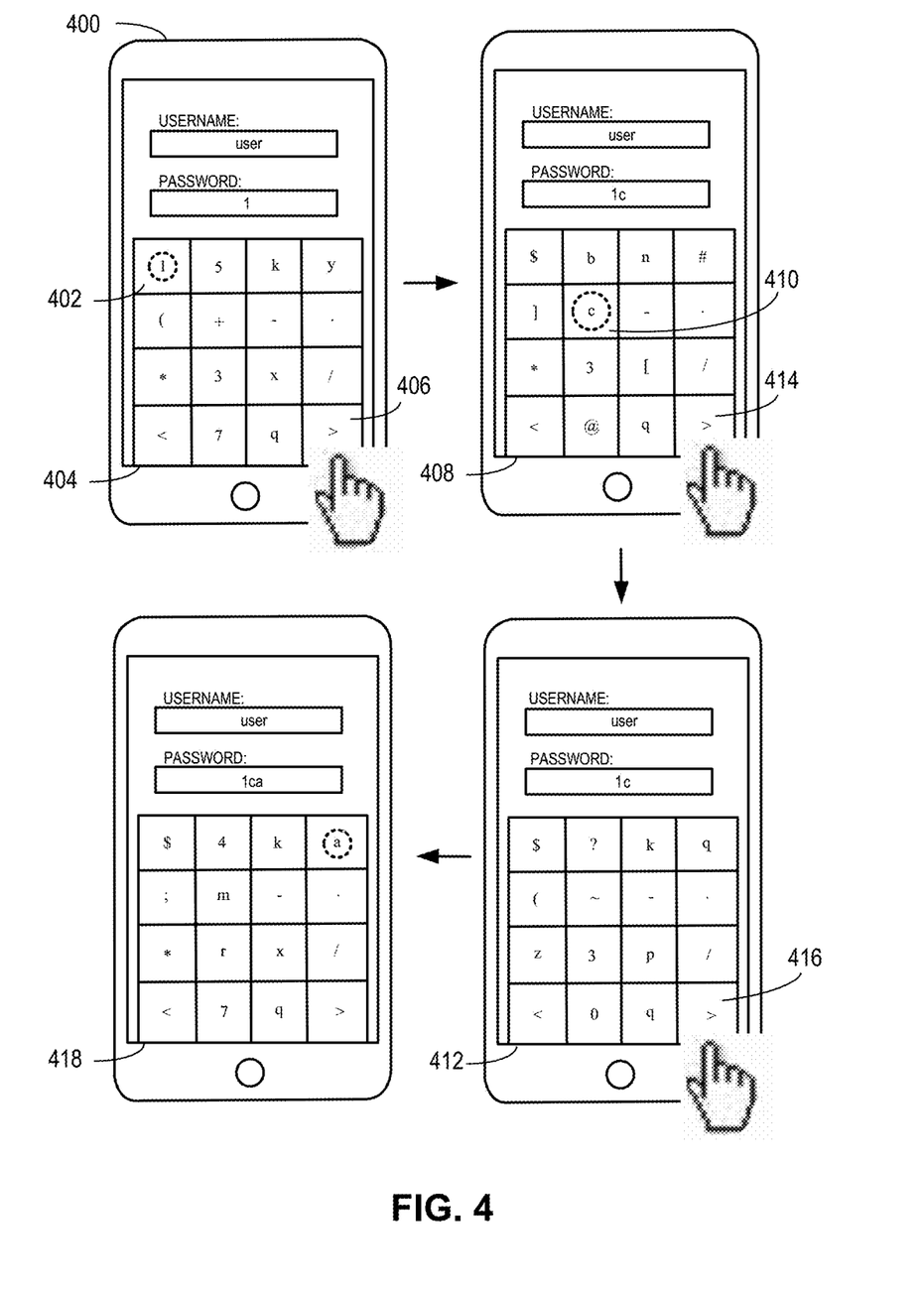
FIG. 4 presents an illustration of a mobile device displaying a portion of an exemplary keyboard sequence that includes a shortcut keyboard with zero password characters, in accordance with an embodiment of the present application.

FIG. 4 presents an illustration of a mobile device 400 displaying a portion of an exemplary keyboard sequence that includes a shortcut keyboard with zero password characters, in accordance with an embodiment of the present application. As depicted in FIG. 4, the user may click on a key 402 labeled "1" on a shortcut keyboard 404 to input the number "1". The user may then click the next keyboard key 406 labeled with ">" to switch to the shortcut keyboard 408. The user may click on a key 410 labeled "c" to input the character "c" using shortcut keyboard 408, and then switch to a shortcut keyboard 412 by clicking on a key 414 labeled with ">". Shortcut keyboard 412 has no keys for inputting password characters. All of the keys of shortcut keyboard 412 are labeled with characters other than password characters. The user determines that there is no password character on shortcut keyboard 412, and clicks a key 416 labeled with ">" to switch to shortcut keyboard 418, and continue to enter the characters of the password.

By inserting shortcut keyboards with no password characters into the keyboard sequence, the system improves the password input security. The shortcut keyboards without password characters may confuse malicious parties attempting to gain unauthorized access to an account. A malicious party cannot determine whether a shortcut keyboard has a password character or not, thereby substantially reducing the probability of successfully cracking a password.

The system may provide the user with an interface to set the security level and/or to configure the parameters of the keyboard sequence. The system may then generate a keyboard sequence with parameters that correspond to the security level. For example, the system can set the total number of shortcut keyboards in the keyboard sequence, the number of shortcut keyboards with zero password characters, and the number of random characters on each shortcut keyboard according to the security level. The system may then generate the keyboard sequence according to the user-specified configuration.

By increasing the total number of shortcut keyboards in the keyboard sequence, the system increases the security level of the keyboard sequence and the password becomes more difficult to crack. Inserting greater numbers of shortcut keyboards with zero password characters can confuse a malicious party, which makes the password more difficult to crack and increases the security level of the keyboard sequence. Adding larger number of random characters on each shortcut keyboard also increases the difficulty of cracking the password and increases the security level of the keyboard sequence.

For example, the security levels available may range from level I to level III, with level I being a lowest security level and level III being the highest security level available. The user may set the security level to level I. The system may then generate a keyboard sequence with six shortcut keyboards, no shortcut keyboards with zero password characters, and six random characters on each shortcut keyboard.

If the user sets the security level to level II, the system may generate a keyboard sequence with eight shortcut keyboards, two shortcut keyboards with zero password characters, and nine random characters on each shortcut keyboard.

Some implementations may allow the user to enter a security level in an input field and/or allow a user to select from a predetermined list of security levels. The system then sets the security level based on the user's input. In some implementations, the system may generate the keyboard sequence in memory to improve the security of the system. The system does not need to store the keyboard sequence on a device (e.g., mobile phone), and there is reduced risk of exposing the security data to malicious parties.

In some implementations, the system may generate multiple different keyboard sequences for a password. The keyboard sequences may vary by the number of shortcut keyboards, the number of random characters, the distribution and placement of password characters on the shortcut keyboards, or other factors. The system may then randomly select one of the keyboard sequences and present the selected keyboard sequence to the user for password input.

In some implementations, the system may randomly determine the parameters of a keyboard sequence. The system may randomly determine the number of shortcut keyboards in the keyboard sequence, the number of password characters in each shortcut keyboard, and/or other parameters of the keyboard sequence.

Associating Keyboard Sequences with Scenarios and/or Applications

The system may detect a scenario in which the user is inputting a password, and determine a keyboard sequence appropriate for the scenario. The system may display the same keyboard sequence to the user for the same scenario associated with the user inputting a password. When generating the keyboard sequence, the system may record the scenario for the generated keyboard sequence. The system may store data associating the password input scenario with the keyboard sequence. The system displays the same keyboard sequence to the user whenever the user repeats the scenario. For example, when the user is logging on to an email service, the system records data indicating that a specific keyboard sequence is associated with logging on to the email service. The next time the user logs on to the email service, the system detects the login scenario, and the system displays the same keyboard sequence for the login scenario. The system may also display a default keyboard sequence for all scenarios and/or all passwords. The user may select whether to use the default keyboard sequence.

The methods disclosed herein for efficiently inputting a password are applicable to a universal input keyboard as well as to built-in keyboard software. Built-in keyboard software is provided by a software application for use with that particular software application. Universal input software is provided by a third party and is not associated with a specific application. A user may use universal input software to input into any application. Two exemplary methods for inputting a password are described below with respect to built-in keyboard software and universal input software.

The user may input a password using built-in keyboard software such as that provided by Alipay. Alipay is a third-party online payment platform. A user may use a built-in keyboard software provided by Alipay to input a password for login or to make a payment. The built-in keyboard software may detect the current password input environment. For example, the built-in keyboard software may detect that the user is inputting a password under a login scenario, or the built-in keyboard software may detect that the user is inputting a password under a payment scenario.

The system may generate a corresponding keyboard sequence according to password data as inputted by the user. The system may store data indicating an association between a keyboard sequence and a scenario. For example, the system may store data indicating that a keyboard sequence S1 corresponds to a login scenario, and store data indicating that a keyboard sequence S2 corresponds to a payment scenario. The system may also use historical password data to generate a keyboard sequence and associate the keyboard sequence with a scenario.

The system may subsequently detect that the user is making a payment using Alipay. For example, the user may click on a password input field to input a password for payment. The system may detect this scenario and display the keyboard sequence S2 corresponding to the payment scenario.

The user may also use universal input software to enter password data. For example, Sogou Pinyin is a software tool that allows the user to input characters in any application software. The application software may call a universal input software such as Sogou Pinyin to receive a password as user input. For example, when using the Taobao online shopping website or client software, the user may use the universal input software to input password information. As another example, when using QQ instant messaging, email or other services, the user may use the universal input software to input password information.

The universal input software (e.g., Sogou Pinyin) can receive the password as user input and provide the password to an application, as well as store data associating a keyboard sequence with the application. For example, the universal input software may detect that TaoBao or QQ is calling for the universal input software to receive a password as user input during authentication. The universal input software may include a password input component for performing the password input and functions associated with generating and using the shortcut keyboards and keyboard sequences. The universal input software may generate a keyboard sequence based on the password information and store data indicating a corresponding relationship between the keyboard sequence and an application program that uses the password information. For example, the system may store data associating a keyboard sequence S3 with a TaoBao application, and also store data associating a keyboard sequence S4 with a QQ application.

The universal input software may detect when a user is inputting a QQ login password. For example, the user may click on a password input field to log into QQ. The universal input software may detect that the QQ application is being called, and displays the keyboard sequence S4 corresponding to the QQ application based on stored data associating a keyboard sequence S4 with a QQ application.

The system in the above examples stores data indicating the corresponding relationship between the keyboard sequence and the scenario or application, and is thereby capable of automatically detecting the scenario or application and automatically displaying the keyboard sequence corresponding to the scenario or application.

User Selection and Customization of a Keyboard Sequence

In some implementations, the system does not store data associating a keyboard sequence with a scenario or application program, but rather allows the user to select the keyboard sequence. For example, the password input apparatus may generate the keyboard sequence S3 to correspond to TaoBao and the keyboard sequence S4 to correspond to QQ, but does not record the corresponding relationships. When the user uses QQ, the system displays identifiers for keyboard sequence S3 and keyboard sequence S4 to allow the user to select a keyboard for input.

Figure 5:
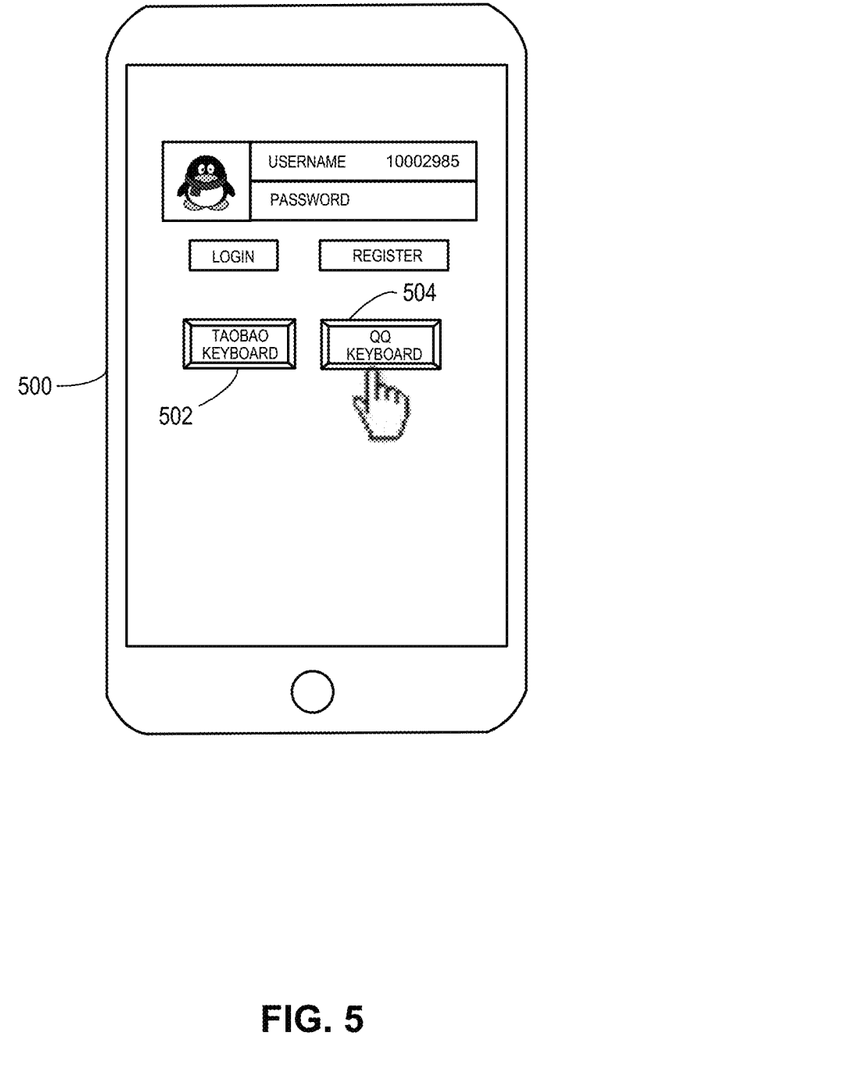
FIG. 5 presents an illustration of a mobile device that allows the user to select a keyboard sequence, in accordance with an embodiment of the present application.

FIG. 5 presents an illustration of a mobile device 500 that allows the user to select a keyboard sequence, in accordance with an embodiment of the present application. Mobile device 500 may be, for example, a mobile phone. In FIG. 5, as the user is logging into QQ, mobile device 500 displays shortcut icons for two keyboard sequences, which are respectively a "TaoBao keyboard" icon 502 and a "QQ keyboard" icon 504. The user may click on the "QQ keyboard" icon 504 to trigger the display of the keyboard sequence S4. Mobile device 500 does not detect the scenario information. Instead, the user selects the keyboard sequence according to the current scenario associated with his password input.

For the keyboard sequences, the system may also generate shortcut keyboards with different appearances for different applications and/or scenarios. For example, when the system displays the keyboard sequence S4 for logging into or making payment with QQ, the system may add a small Q icon to each shortcut keyboard. The system may also display the characters on the keys of the shortcut keyboards in a red color for QQ-related password input Likewise, the system may display the characters on the keys of the shortcut keyboards in a black color for TaoBao-related password input.

The system may customize generating the keyboard sequence and shortcut keyboards based on specific requirements, including user-specified configuration requirements. Some examples of how the keyboard sequences may be customized are described below.

The system may receive configuration information from the user for configuring a keyboard sequence and the shortcut keyboards within the keyboard sequence. The configuration information may include the number of keys of each shortcut keyboard in the keyboard sequence, the number of characters on each key, the number and key locations of password characters on each shortcut keyboard, and/or the random characters on the shortcut keyboards. The system may configure the shortcut keyboards according to the keyboard configuration information received from the user.

The system may also receive user input to change keyboard sequences or change the settings for generating the keyboard sequences. For example, the system may provide the user with an option to delete a keyboard sequence. A user may decide to delete a keyboard sequence if he no longer wants to use the keyboard sequence. The system may generate a new keyboard sequence based on a password inputted by the user after the old keyboard sequence is deleted.

The system may also allow the user to enable or disable the generation of keyboard sequences. When generating keyboard sequences is disabled, after the user inputs a password, the system does not generate a keyboard sequence. Alternatively, a built-in keyboard software may include a password generating component that, after successful password verification, prompts the user whether to generate a keyboard sequence or not. The system then generates the keyboard sequence if the user selects generate. In some implementations, the system may prompt the user whether to enable or disable generating a keyboard sequence, and the user may respond accordingly.

Figure 6:
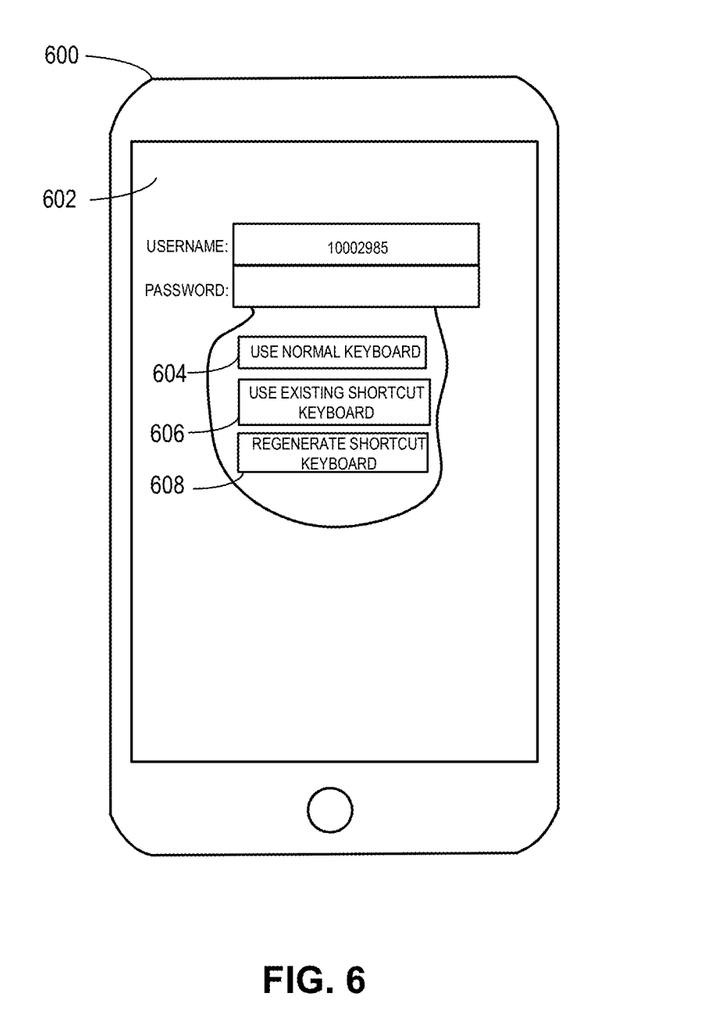
FIG. 6 presents an illustration of a mobile device displaying keyboard selection options, in accordance with an embodiment of the present application.

FIG. 6 presents an illustration of a mobile device 600 displaying keyboard selection options, in accordance with an embodiment of the present application. Mobile device 600 may display the keyboard selection options when the system receives user input indicating that the user is entering a password.

As depicted in FIG. 6, the system displays on a screen 602 a "use normal keyboard" key 604, a "use existing shortcut keyboard" key 606 and a "regenerate shortcut keyboard" key 608. A user may click on key 604 to switch to a normal keyboard.

If the system generates and stores a keyboard sequence, the system may display options to use an existing keyboard sequence or to regenerate a keyboard sequence when the user is entering a password. The user may click on key 606 to use an existing keyboard sequence. The user may also click on key 608 to regenerate a keyboard sequence.

In some cases the user may have multiple passwords. Each password may be associated with a respective keyboard sequence. The user may customize the name for each keyboard sequence corresponding to each password. For example, a user password "123456" may correspond to a keyboard sequence A, and another password "654321" may correspond to a keyboard sequence B. When the user needs to input a password, the system may display shortcut icons representing the two keyboard sequences, and the user may select one of the keyboard sequences based on the password that the user needs to input.

Exemplary Apparatus

Figure 7:
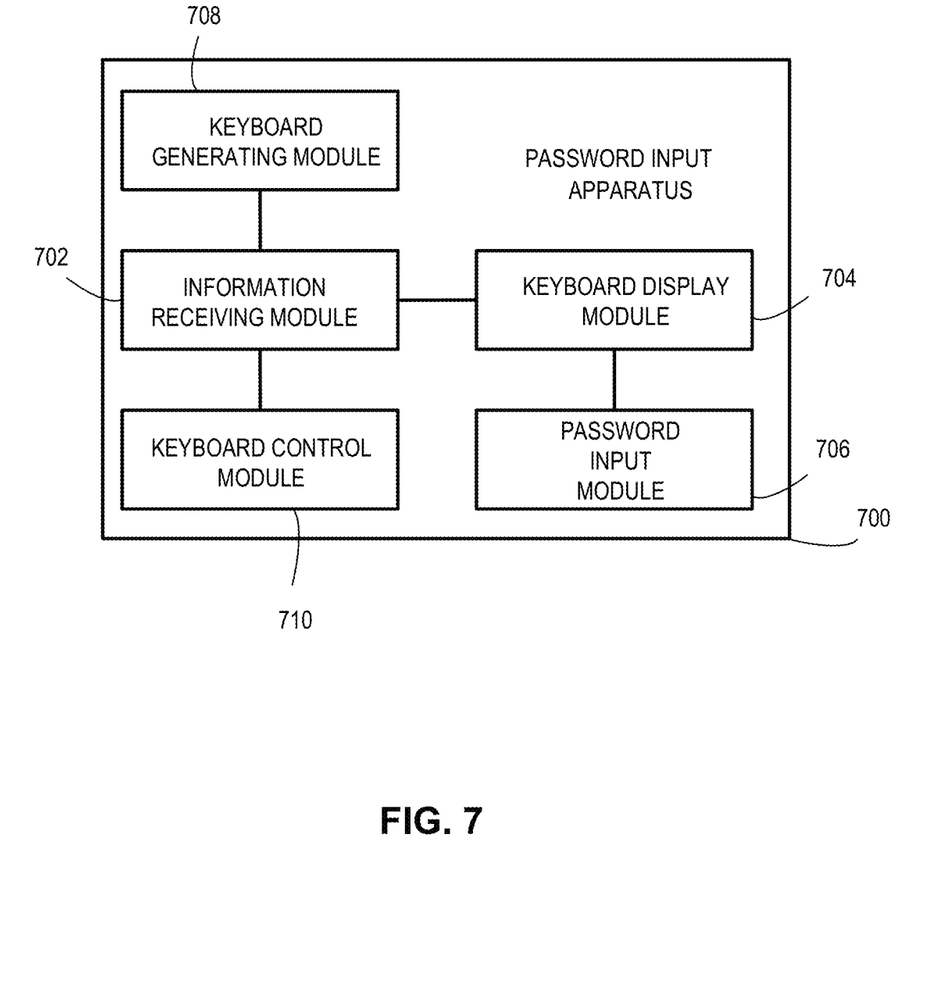
FIG. 7 presents a block diagram illustrating an exemplary password input apparatus, in accordance with an embodiment of the present application.

FIG. 7 presents a block diagram illustrating an exemplary password input apparatus 700, in accordance with an embodiment of the present application. Password input apparatus 700 may execute the methods described herein. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices.

Specifically, apparatus 700 can comprise any combination of an information receiving module 702, a keyboard display module 704, a password input module 706, a keyboard generating module 708, and a keyboard control module 710. Note that apparatus 700 may also include additional modules and data not depicted in FIG. 7, and different implementations may arrange functionality according to a different set of modules. Embodiments of the present invention are not limited to any particular arrangement of modules.

Information receiving module 702 is configured to receive user input indicating that the user will enter a password. Keyboard display module 704 is configured to display shortcut keyboards in a keyboard sequence. A shortcut keyboard may include one or more password characters or no password characters at all. Keyboard display module 704 displays the shortcut keyboards in a sequence according to the arrangement of each of the shortcut keyboard's respective password characters in the password. Password input module 706 is configured to receive password characters that the user selects and inputs through the shortcut keyboards. Password input module 706 may also be configured to determine and/or generate the password according to the password characters that the user selects and inputs.

Keyboard generating module 708 may be configured to generate a keyboard sequence corresponding to a password based on the user's password input, and the keyboard sequence includes at least two shortcut keyboards. Keyboard generating module 708 may also be configured to generate the keyboard sequence in the memory of the apparatus. Keyboard generating module 708 may be further configured to add at least one keyboard with zero password characters to the keyboard sequence. Keyboard generating module 708 may be configured to add to the keyboard sequence one or more shortcut keyboards with a key for inputting at least two password characters simultaneously. Keyboard control module 710 may be configured to perform enable, disable, delete, or select operations on the keyboard sequence or the shortcut keyboards according to keyboard control information.

Information receiving module 702 may be further configured to receive security level settings for generating the keyboard sequence. The security level settings for generating a keyboard sequence may include parameter values such as the number of shortcut keyboards, the number of keyboards with zero password characters, and the number of random characters that are not password characters. Keyboard generating module 708 may generate the keyboard sequence with the security level setting received by information receiving module 702.

Keyboard display module 704 may also be configured to detect a scenario associated with input of the password. Keyboard display module 704 may display a keyboard sequence corresponding to the scenario based on stored data indicating a corresponding relationship between the keyboard sequence and the scenario. Examples of password input scenarios include a login scenario, a payment scenario, or a scenario associated with an application program that uses the password.

Information receiving module 702 may be further configured to receive keyboard configuration information. Keyboard generating module 708 may be further configured to use the keyboard configuration information to configure the shortcut keyboards in the keyboard sequence.

Information receiving module 702 may be further configured to receive keyboard control information that includes an enable or disable setting for generating the keyboard sequence and delete or select settings for deleting a keyboard sequence or shortcut keyboard and selecting a keyboard sequence or shortcut keyboard. Keyboard control module 710 may be configured to perform corresponding operations on the keyboard sequence or the shortcut keyboards according to the keyboard control information.

Figure 8:
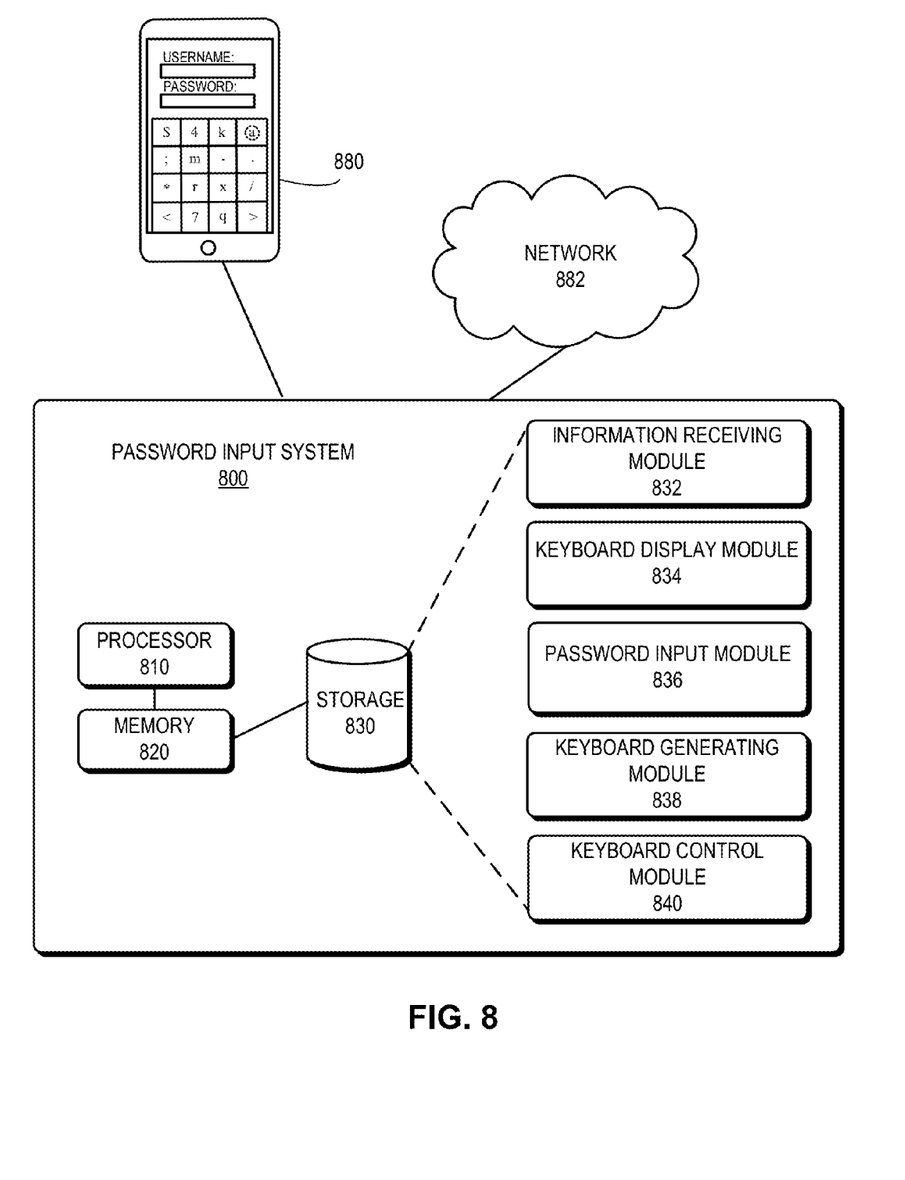
FIG. 8 presents a block diagram illustrating an exemplary password input system, in accordance with an embodiment of the present application.

FIG. 8 presents a block diagram illustrating an exemplary password input system 800, in accordance with an embodiment of the present application. Password input system 800 includes a processor 810, a memory 820, and a storage device 830. Storage 830 typically stores instructions that can be loaded into memory 820 and executed by processor 810 to perform the methods described above. In one embodiment, the instructions in storage 830 can implement an information receiving module 832, a keyboard display module 834, a password input module 836, a keyboard generating module 838, and a keyboard control module 840, which can communicate with each other through various means.

In some embodiments, modules 832-840 can be partially or entirely implemented in hardware and can be part of processor 810. Further, in some embodiments, the password input system may not include a separate processor and memory. Instead, in addition to performing their specific tasks, modules 832-840, either separately or in concert, may be part of special-purpose computation engines.

Storage 830 stores programs to be executed by processor 810. Specifically, storage 830 stores a program that implements a system (e.g., application) for inputting a password. During operation, the application program can be loaded from storage 830 into memory 820 and executed by processor 810. As a result, password input system 800 can perform the functions described above. Password input system 800 further includes a display 880, and can be coupled to a keyboard and a pointing device, and can be coupled via one or more network interfaces to a network 882.

Information receiving module 832 may be configured to receive user input indicating that the user will enter a password. Keyboard display module 834 may be configured to display shortcut keyboards in a keyboard sequence. Password input module 836 may be configured to receive password characters that the user selects and inputs through the shortcut keyboards. Keyboard generating module 838 may be configured to generate a keyboard sequence corresponding to a password based on the user's password input. Keyboard control module 840 may be configured to perform operations on the keyboard sequence or the shortcut keyboards according to keyboard control information. These components of password input system 800 operate together to generate and display a keyboard sequence based on a password.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for receiving password input from a user, comprising:
   receiving, by a computing device, user input indicating that the user is entering a password using an ordered plurality of shortcut keyboards for comparing to a stored password consisting of a series of characters;
   wherein each of the shortcut keyboards corresponds to an ordinal position in the ordered plurality;
   wherein each of the shortcut keyboards include one randomly located key labeled as one or more characters, and further includes a plurality of other keys which are each randomly labeled with other characters not included in the password, and
   wherein the one or more characters is determined using the ordinal position of the shortcut keyboard to locate the one or more characters from within the series;
   displaying a first shortcut keyboard of the ordered plurality of shortcut keyboards,
   receiving a first user input to the first shortcut keyboard indicating that the user has selected a first key labeled as a first one or more characters;
   determining a count of the first one or more characters;
   determining a first password characters corresponding to the count and located within the series at the ordinal position of the first shortcut keyboard;
   comparing the determined first password characters and the first one or more characters;
   in response to determining that the comparison is a match,
   displaying a second shortcut keyboard of the ordered plurality of shortcut keyboards;
   wherein the second shortcut keyboard corresponds to a next ordinal position in the ordered plurality subsequent to the ordinal position of the first shortcut keyboard;
   receiving a second user input to the displayed second shortcut keyboard indicating that the user has selected a second key labeled as a second one or more characters;
   determining a second count of the second one or more characters;
   determining a second password characters corresponding to the second count and located within the series at the ordinal position of the second shortcut keyboard;
   comparing the determined second password characters and the second one or more characters; and
   determining, based on the first user input and the second user input, whether the password entered by the user matches the stored password.

2. The method of claim 1, further comprising:
   generating the ordered plurality of shortcut keyboards based on the password, wherein the ordered plurality of shortcut keyboards comprises at least two shortcut keyboards.

3. The method of claim 2, wherein generating the ordered plurality of shortcut keyboards comprises generating the ordered plurality of shortcut keyboards in a memory of the computing device.

4. The method of claim 2, wherein generating the ordered plurality of shortcut keyboards comprises:
   generating the ordered plurality of shortcut keyboards with at least one shortcut keyboard with zero characters from the password.

5. The method of claim 4, further comprising:
   receiving user input setting a security level for generating the ordered plurality of shortcut keyboards, wherein generating the ordered plurality of shortcut keyboards comprises:
   based on the security level, setting parameters for the ordered plurality of shortcut keyboards that include at least one of a number of the shortcut keyboards, a number of shortcut keyboards with zero password characters, and a number of random characters that are not password characters on each shortcut keyboard.

6. The method of claim 2, wherein generating the ordered plurality of shortcut keyboards comprises:
   generating the ordered plurality of shortcut keyboards to include at least one shortcut keyboard with a key used for inputting at least two password characters simultaneously.

7. The method of claim 1, wherein displaying the first shortcut keyboard further comprises:
   detecting a password input scenario associated with the user inputting the password;

retrieving data indicating a corresponding relationship between the password input scenario and a particular ordered plurality of shortcut keyboards; and displaying the first shortcut keyboard from the particular ordered plurality of shortcut keyboards.

8. The method of claim 7, wherein detecting the password input scenario comprises determining that the user is inputting the password as part of a login scenario or a payment scenario or that the password is for a specific application; and further comprising storing data associating the ordered plurality of shortcut keyboards with one of the login scenario, the payment scenario, or the specific application.

9. The method of claim 2, further comprising:
receiving keyboard configuration information to configure the ordered plurality of shortcut keyboards; and
configuring the ordered plurality of shortcut keyboards according to the keyboard configuration information.

10. The method of claim 1, further comprising:
receiving additional user input to enable or disable generating the ordered plurality of shortcut keyboards, or to delete or select the ordered plurality of shortcut keyboards; and, based on the additional user input, performing one of:
enabling generating the ordered plurality of shortcut keyboards,
disabling generating the ordered plurality of shortcut keyboards,
deleting the ordered plurality of shortcut keyboards, and
selecting the ordered plurality of shortcut keyboards.

11. A password input apparatus, comprising:
one or more processors;
a memory;
a non-transitory computer-readable medium coupled to the one or more processors storing instructions stored that, when executed by the one or more processors, cause the computing system to perform a method for receiving password input from a user, comprising:
receiving, by a computing device, user input indicating that the user is entering a password using an ordered plurality of shortcut keyboards for comparing to a stored password consisting of a series of characters;
wherein each of the shortcut keyboards corresponds to an ordinal position in the ordered plurality;
wherein each of the shortcut keyboards include one randomly located key labeled as one or more characters, and further includes a plurality of other keys which are each randomly labeled with other characters not included in the password, and
wherein the one or more characters is determined using the ordinal position of the shortcut keyboard to locate the one or more characters from within the series;
displaying a first shortcut keyboard of the ordered plurality of shortcut keyboards,
receiving a first user input to the first shortcut keyboard indicating that the user has selected a first key labeled as a first one or more characters;
determining a count of the first one or more characters;
determining a first password characters corresponding to the count and located within the series at the ordinal position of the first shortcut keyboard;
comparing the determined first password characters and the first one or more characters;
in response to determining that the comparison is a match, displaying a second shortcut keyboard of the ordered plurality of shortcut keyboards;
wherein the second shortcut keyboard corresponds to a next ordinal position in the ordered plurality subsequent to the ordinal position of the first shortcut keyboard;
receiving a second user input to the displayed second shortcut keyboard indicating that the user has selected a second key labeled as a second one or more characters;
determining a second count of the second one or more characters;
determining a second password characters corresponding to the second count and located within the series at the ordinal position of the second shortcut keyboard;
comparing the determined second password characters and the second one or more characters; and
determining, based on the first user input and the second user input, whether the password entered by the user matches the stored password.

12. The apparatus of claim 11, wherein the method further comprises:
generating the ordered plurality of shortcut keyboards based on the password, wherein the ordered plurality of shortcut keyboards comprises at least two shortcut keyboards.

13. The apparatus of claim 12, wherein generating the ordered plurality of shortcut keyboards comprises generating the ordered plurality of shortcut keyboards with at least one shortcut keyboard with zero characters from the password.

14. The apparatus of claim 13, wherein the method further comprises:
receiving user input setting a security level for generating the ordered plurality of shortcut keyboards, wherein generating the ordered plurality of shortcut keyboards comprises:
based on the security level, setting parameters for the ordered plurality of shortcut keyboards that include at least one of a number of the shortcut keyboards, a number of shortcut keyboards with zero password characters, and a number of random characters that are not password characters on each shortcut keyboard.

15. The apparatus of claim 12, wherein generating the ordered plurality of shortcut keyboards corresponding to the password comprises:
generating the ordered plurality of shortcut keyboards to include at least one shortcut keyboard with a key used for inputting at least two password characters simultaneously.

16. The apparatus of claim 11, wherein displaying the first shortcut keyboard further comprises:
detecting a password input scenario associated with the user inputting the password;
retrieving data indicating a corresponding relationship between the password input scenario and a particular ordered plurality of shortcut keyboards; and
displaying the first shortcut keyboard from the particular ordered plurality of shortcut keyboards.

17. The apparatus of claim 16, wherein detecting the password input scenario comprises determining that the user is inputting the password as part of a login scenario or a payment scenario or that the password is for a specific application; and
the method further comprises storing data associating the ordered plurality of shortcut keyboards with one of the login scenario, the payment scenario, or the specific application.

18. The apparatus of claim 12, wherein the method further comprises:

receiving additional user input to enable or disable generating the ordered plurality of shortcut keyboards, or to delete or select the ordered plurality of shortcut keyboards; and, based on the additional user input, performing one of:
enabling generating the ordered plurality of shortcut keyboards,
disabling generating the ordered plurality of shortcut keyboards,
deleting the ordered plurality of shortcut keyboards, and
selecting the ordered plurality of shortcut keyboards.

19. A non-transitory computer-readable storage medium storing instructions that when executed by a computer cause the computer to perform a method for receiving password input from a user, the method comprising:

receiving, by a computing device, user input indicating that the user is entering a password using an ordered plurality of shortcut keyboards for comparing to a stored password consisting of a series of characters;
wherein each of the shortcut keyboards corresponds to an ordinal position in the ordered plurality;
wherein each of the shortcut keyboards include one randomly located key labeled as one or more characters, and further includes a plurality of other keys which are each randomly labeled with other characters not included in the password, and
wherein the one or more characters is determined using the ordinal position of the shortcut keyboard to locate the one or more characters from within the series;
displaying a first shortcut keyboard of the ordered plurality of shortcut keyboards,
receiving a first user input to the first shortcut keyboard indicating that the user has selected a first key labeled as a first one or more characters;
determining a count of the first one or more characters;
determining a first password characters corresponding to the count and located within the series at the ordinal position of the first shortcut keyboard;
comparing the determined first password characters and the first one or more characters;
in response to determining that the comparison is a match, displaying a second shortcut keyboard of the ordered plurality of shortcut keyboards;
wherein the second shortcut keyboard corresponds to a next ordinal position in the ordered plurality subsequent to the ordinal position of the first shortcut keyboard;
receiving a second user input to the displayed second shortcut keyboard indicating that the user has selected a second key labeled as a second one or more characters;
determining a second count of the second one or more characters;
determining a second password characters corresponding to the second count and located within the series at the ordinal position of the second shortcut keyboard;
comparing the determined second password characters and the second one or more characters; and
determining, based on the first user input and the second user input, whether the password entered by the user matches the stored password.

20. The method of claim 1, wherein one or more no-password-character keyboards which include no keys labeled with a character from the password are displayed between the successive displays of shortcut keyboards.

21. The non-transitory computer-readable storage medium of claim 19, wherein one or more no-password-character keyboards which include no keys labeled with a character from the password are displayed between the successive displays of shortcut keyboards.

* * * * *